United States Patent [19]
Jowett et al.

[11] Patent Number: 6,153,094
[45] Date of Patent: *Nov. 28, 2000

[54] WASTEWATER TREATMENT METHOD AND APPARATUS

[75] Inventors: E. Craig Jowett, 177 Cobblestone Pl., Box 385, Rockwood, Ontario, Canada, N0B 2K0; Michaye Louise McMaster, Kitchner, Canada

[73] Assignee: E. Craig Jowett, Rockwood, Canada

[ * ] Notice: This patent is subject to a terminal disclaimer.

[21] Appl. No.: 09/304,529

[22] Filed: May 4, 1999

Related U.S. Application Data

[63] Continuation-in-part of application No. 08/964,394, Nov. 6, 1997, Pat. No. 5,980,739, which is a continuation-in-part of application No. 08/177,964, Jan. 6, 1994, Pat. No. 5,707,513, which is a continuation-in-part of application No. 07/882,549, May 13, 1992, abandoned.

[51] Int. Cl.[7] .................................. C02F 3/04; C02F 3/30
[52] U.S. Cl. .......................... 210/151; 210/202; 210/206; 210/218; 210/605; 210/615; 210/903
[58] Field of Search ............................. 210/605, 615, 210/617, 630, 747, 150, 151, 202, 218, 255, 261, 262, 296, 170, 616, 618, 206, 913

[56] References Cited

U.S. PATENT DOCUMENTS

| | | | |
|---|---|---|---|
| 713,896 | 11/1902 | Maighen | 210/286 |
| 808,411 | 12/1905 | Venuble | 210/150 |
| 2,200,580 | 5/1940 | Pruss | 210/150 |
| 2,308,866 | 1/1943 | Dekema | 210/617 |
| 2,463,464 | 3/1949 | Lind | 210/150 |
| 3,112,261 | 11/1963 | Porter | 210/150 |
| 3,293,174 | 12/1966 | Robjohns | 210/150 |
| 3,543,937 | 12/1970 | Choun | 210/150 |
| 3,617,541 | 11/1971 | Pan | 210/150 |
| 4,100,073 | 7/1978 | Hopcroft | 210/532.2 |
| 4,201,663 | 5/1980 | Kelley | 210/16 |
| 4,427,548 | 1/1984 | Quick | 210/617 |
| 4,465,594 | 8/1984 | Luak | 210/151 |
| 4,524,139 | 6/1985 | Fuchs | 210/618 |
| 4,566,971 | 1/1986 | Reimann et al. | 210/616 |
| 4,576,718 | 3/1986 | Reischl et al. | 210/151 |
| 4,664,803 | 5/1987 | Fuchs et al. | 210/616 |
| 4,708,792 | 11/1987 | Takamoto et al. | 210/150 |
| 4,800,021 | 1/1989 | Desbos | 210/605 |
| 4,810,377 | 3/1989 | Kato | 210/150 |
| 4,895,645 | 1/1990 | Zorich | 210/98 |
| 4,925,552 | 5/1990 | Bateson | 210/150 |
| 4,983,299 | 1/1991 | Lupton | 210/617 |
| 5,049,265 | 9/1991 | Boyd | 210/150 |
| 5,217,616 | 6/1993 | Sanyal et al. | 210/150 |
| 5,266,213 | 11/1993 | Gillham | 210/170 |
| 5,330,651 | 7/1994 | Robertson et al. | 210/170 |
| 5,500,111 | 3/1996 | Fujino | 210/150 |
| 5,762,784 | 6/1998 | Jowett | 210/150 |

FOREIGN PATENT DOCUMENTS

| | | |
|---|---|---|
| 104525 | 4/1984 | European Pat. Off. . |
| 399578 | 4/1907 | France . |
| 2644773 | 9/1990 | France . |
| WO80/02556 | 11/1980 | WIPO . |

*Primary Examiner*—Christopher Upton
*Attorney, Agent, or Firm*—Anthony Asquith & Co.

[57] ABSTRACT

The treatment system is for use with septic tank effluent. Water is passed over polyurethane foam blocks, arranged in a heap so that air can circulate freely around the blocks. The size of the foam cells is small enough that water soaks into the blocks and is retained therin. The foam is soft and easily deformed. At the points of block-to-block engagement, the blocks deflect and conform to each other, giving rise to a large contact area through which water can pass between blocks.

42 Claims, 8 Drawing Sheets

6,153,094

WASTEWATER TREATMENT METHOD AND APPARATUS

This is a Continuation-in-Part of patent application Ser. No. 08/964,394 (filed Nov. 6, 1997), now U.S. Pat. No. 5,980,739; which was a Continuation-in-Part of patent application Ser. No. 08/177,964 (filed Jan. 6, 1994), now Pat. No. 5,707,513 (issued Jan. 13, 1998); which was a Continuation-in-part of patent application Ser. No. 07/882,549 (filed May 13, 1992), now abandoned.

TECHNICAL FIELD

This invention relates to aerobic and ensuing treatments of domestic sewage and wastewater, and certain types of industrial wastewaters, and to the renovation of polluted water in general.

BACKGROUND ART

The most common method for on-site treatment of domestic sewage and wastewater is a conventional septic system using a septic tank for anaerobic treatment and a tile bed, raised bed, or sand filter for aerobic biofiltration. These solid particle aerobic filters are readily constructed, and are passive, single-pass biofilters which require little maintenance. However, even in ideal conditions, nitrate and phosphorus are released to the groundwater because the treated water cannot be collected for further treatment. Loading rates of potent wastewater such as septic tank effluent in solid particle media are low, usually 15 cm/day (cm3 volume/cm2 area), and treatment beds therefore require large volumes of filter media. A tile bed requires 80400 m3 of unsaturated soil, and a sand filter requires about 2535 m3 of sand and gravel. Significantly higher loading rates are required for the biofilter to be transportable. The physical characteristics of natural filter media such as soil and sand are highly variable. The large volumes and natural variations preclude pre-manufacturing the biofilters to consistent specifications so that performance can be guaranteed at any site. Aerobic package plants that are manufactured off-site are generally highly mechanical units with high capital cost and high maintenance requirements.

There is a need for a low-maintenance single-pass aerobic biofilter with a filter medium that has predictable physical properties and therefore predictable treatment performance. It should withstand high loading rates so it can be pre-manufactured to consistent specifications in a small volume and transported to site. Burial of the system and removal of nitrate and other undesirable contaminants after aerobic treatment is also advantageous.

In certain countries, polluted water is used directly for human consumption and cooking, resulting in sickness and death from water-borne diseases. There is a need for a low-cost, low-technology, and transportable aerobic treatment system which removes substantial amounts of biological pathogens.

An at-grade peat system uses natural peat as the filter medium and removes nutrients such as nitrogen and phosphorus. It requires a very specific peat and the loading rate for septic tank effluent is only 4–5 cm/day, thereby precluding central manufacture and transport of the ~50-m3 volume. The peat also requires special handling to avoid over-compaction. The system cannot be buried and it removes a significant area of the property (~200300 m2) from use.

U.S. Pat. No. 5,049,265 (Boyd et al.), granted in 1991, uses biologically active young sphagnum peat in containers which can be buried. The increased water-holding capacity enables treatment to occur at what are stated to be "very high loading rates". The peat is mixed with a non-specific amount of peat fibre to reduce the tendency to clog and pond on the surface. It is compacted by a non-specific amount to prevent channelling if undercompacted, and clogging if overcompacted. Because the medium is inconsistent treatment performance cannot be assured. Loading rates of only 715 cm/day are cited with a preferred rate of <11 cm/day, which is insufficient to allow pre-construction and transport of the 2030 m3 volume to site.

Synthetic filter media have been used for treating relatively clear water. In U.S. Pat. No. 4,427,548 (Quick), granted in 1984, a slab of polyurethane foam is used as a physical and biological filter to remove solids and ammonium from aquarium water. The slab filter must be removed and cleaned frequently and does not constitute an alternative biofilter for treating potent wastewater with high solids and biochemical oxygen demand. Under high loading rates of potent wastewater, solid foam soon plugs up and becomes anaerobic, similar to a solid particle biofilter. German patent number DE-3,235,600 (REIMANN), which was published Mar. 29, 1984, shows foam being used in an aerobic reaction-promoting context.

DISCLOSURE OF INVENTION

It is an object of the invention to provide a single-pass aerobic treatment method and apparatus for potent wastewater in a small contained volume, in New of the above deficiencies of the prior art. Another object is to collect the aerobically treated water for removal of other undesirable contaminants.

The invention includes a high-efficiency biofiltration module which provides thorough wastewater treatment in a relatively small contained volume, because of the distinctive physical properties of a special absorbent filter medium. It also includes preferably at least one water-saturated module which further renovates wastewater while isolated from the natural environment. Each module generally has a specific treatment function, including aeration, nitrate or phosphorus removal, organic solvent removal, etc. Modules of similar function (e.g., two or more aerobic modules and/or two or more saturated modules) may be combined for larger capacity.

Wastewater such as septic tank effluent, or any water which contains biodegradable matter, is introduced into a free-draining aerobic module which contains the special absorbent biofilter medium. The aerobic filter medium is a material with superior water retention and air-permeability properties, such as polyurethane foam panicles or a loam slab with aeration conduits formed through it. The particles have open cellular interiors so that the wastewater is transferred through the interiors of the particles or through the foam slab, while the large voids between the particles or the aeration conduits remain open, precluding plugging by biomat development and allowing for simultaneous wastewater loading and air ventilation. By contrast, solid particle media must be loaded intermittently, then allowed to drain free to be ventilated. They cannot be loaded and ventilated at the same time, and therefore have much lower potential loading rates. In the invention, the combination of water retention and ventilation allows for greatly increased loading rates (consistently 10 times or more higher) over that of solid particle media such as sand or a solid slab of foam without aeration conduits.

The small voids between solid particles are readily bridged by biomat. No plugging of the foam particles in the invention has occurred in laboratory and field experiments even after 10 months of 80 cm/day loading rates and 18 months of continuous use. Field units have incurred 10 months of loading at 55 cm/day of potent wastewater, with 95–99% removal of total suspended solids and BOD, and with no sign of plugging (Table 1). They have incurred surges of 170 cm/day for several days with insignificant effect on performance. On the other hand, peat and sand filters plugged up within one month of use at these high loading rates. In the invention, the superior physical properties of high surface area, high water retention, and permeability to air allow treatment within a small contained volume in a single pass.

TABLE 1

Averaged results of foam field unit treating primary clarifier effluent (T = 5–14° C.).
Flow rates average 2000 L/day, or a very high loading rate of 54 cm/day.

|  | n | Influent | Effluent | %-Removal |
|---|---|---|---|---|
| BOD7 (mg/L) | 9 | 123 | 2.6 | 97–99 |
| TSS | 10 | 82 | 2.8 | 96–98 |
| NH4-N | 7 | 5.9 | 1.1 | — |
| NO3-N | 10 | 0.2 | 22.5 | — |
| Total coliform (CFU/100 mL) | 10 | 1.6e7 | 7.1e4 | 99.3–99.7 |
| Fecal coliform | 10 | 5.6e6 | 3.4e4 | 99.5–99.7 |

The wastewater percolates slowly downwardly through the unsaturated filter medium in the aerobic module, during which time it is renovated by microbial activity. Natural air convection through vents in the container wall ordinarily provides adequate treatment of organic matter, solids, and pathogens. However, to achieve full nitrification and ammonia removal at low temperatures, the air flow through the medium should be increased by means of larger voids between particles or by artificial forced air means. If the wastewater contains adequate dissolved oxygen for the treatment process, simple vents through the container provide adequate aeration by natural convection. The aerobically treated water collects at the bottom of the aerobic module and passes to the next treatment module in series, usually a saturated module with a reactive medium for removal of nitrate, phosphorus, or other constituents. Alternatively the aerobically treated water may be discharged directly to the environment in some cases. The use of contained volumes enables the wastewater to be nitrified, collected, and then denitrified before discharge. Denitrificaton and further biological filter treatment can be provided by one or more saturated modules containing a suitable filter medium. In the water-saturated module(s), non-reactive media such as synthetic foam particles provide a protected attachment means for microbes to biodegrade nitrate or chemicals. Reactive or absorbing media such as coal, limestone, cellulose, or iron oxides provide a variety of treatments for removal of undesirable constituents.

The invention works effectively in drainage and soil conditions which are otherwise inappropriate for conventional, engineered, or peat tile beds. The modules can be placed above or below ground and can be designed to operate with or without electricity. The invention provides a high rate, single-pass aerobic biofilter for potent wastewater treatment which has low maintenance demands, and which can be pre-manufactured off-site and transported to the site for consistent performance. The invention replaces and improves upon tile beds and sand filters, and has fewer maintenance requirements than mechanized aeration systems. Additional features of the invention will become apparent from a consideration of the drawings and the ensuing detailed description.

BRIEF DESCRIPTION OF DRAWINGS

Preferred and alternative embodiments of the invention will now be described in detail, with reference to the accompanying drawings, in which.

BEST MODE FOR CARRYING OUT THE INVENTION

A detailed description of the best mode for carrying out the invention, and of variations on the invention, is as set out below.

Figure 1:
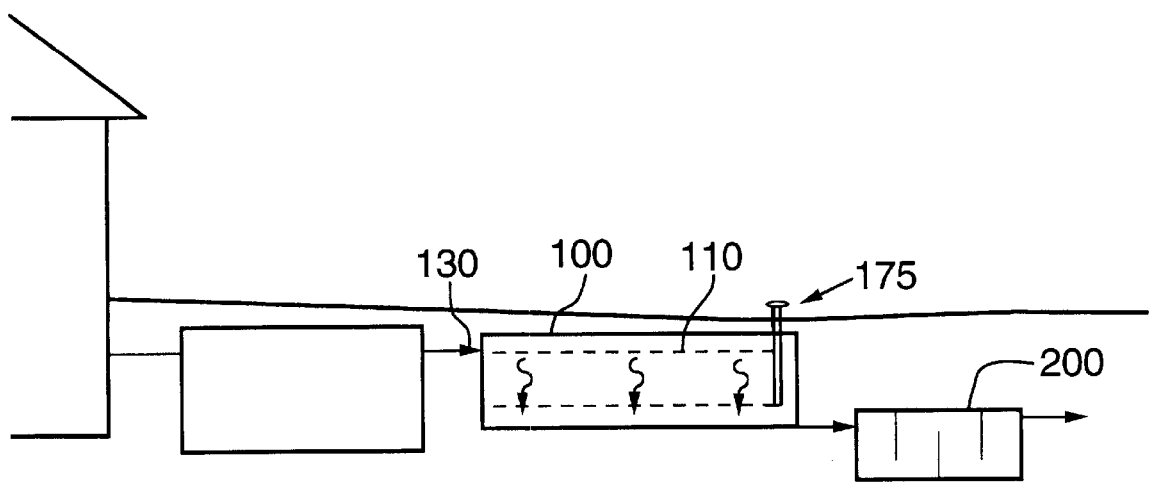
FIG. 1 is a schematic cross section of the modular treatment invention which replaces the conventional tile bed with an aerobic biofilter, and removes additional constituents in subsequent treatment modules.
Figure 2:
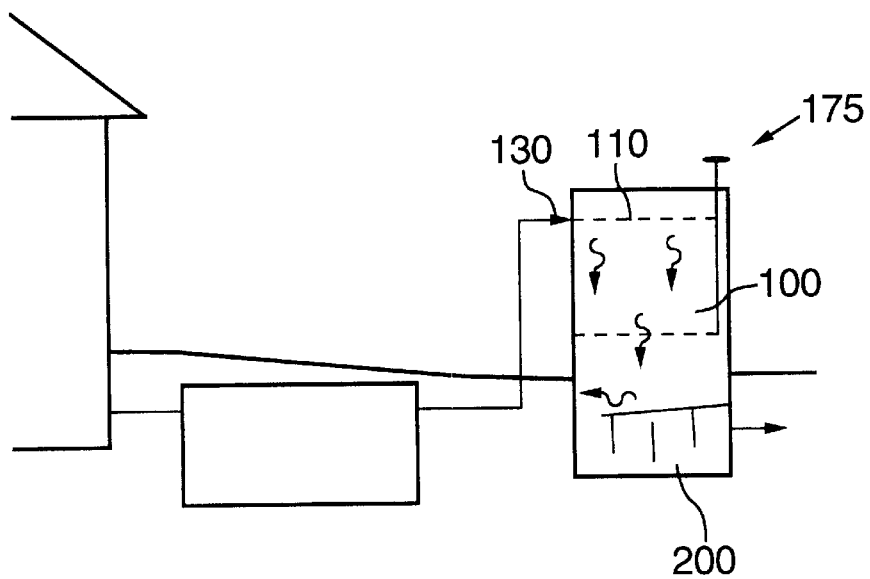
FIG. 2 shows the invention in a vertical configuration for above-ground installation. Ventilation pipes enhance the aerobic treatment, especially to provide thorough nitrification at low temperatures.

Basic structure of the aerobic module:

The aerobic module 100 (shown schematically in FIGS. 1 and 2 and in detail in FIG. 3) is the key element in the treatment process and preferably includes a container 100, a distribution header 110, a treatment medium 116, and a ventilation means 175. The structure of the container 100 includes a wastewater inlet 105, a treated water outlet 125, and an optional inspection or access port 150. It may be buried, as illustrated in FIG. 1, if the water table is sufficiently low, or installed on the surface.

The distribution header 110 is embedded proximate the top of the treatment medium 115 and is connected to the wastewater inlet 105. The distribution header 110 is supported by any suitable means.

The air ventilation means 175 preferably includes an air collection header 155 embedded proximate the bottom of the medium 115, an air inlet 150, an air outlet 170, and an air ventilation fan 165. The air collection header 155 is supported by any suitable means. In another embodiment in which adequate aeration can be provided by natural convection, the air ventilation means 175 includes the air inlet 150 or air outlet 170. In another embodiment, ventilation air may be introduced through the distribution header 110 along with the wastewater by means of a pump using compressed air as a driving means.

The treatment medium 115 substantially fills the module 100.

Figure 4:
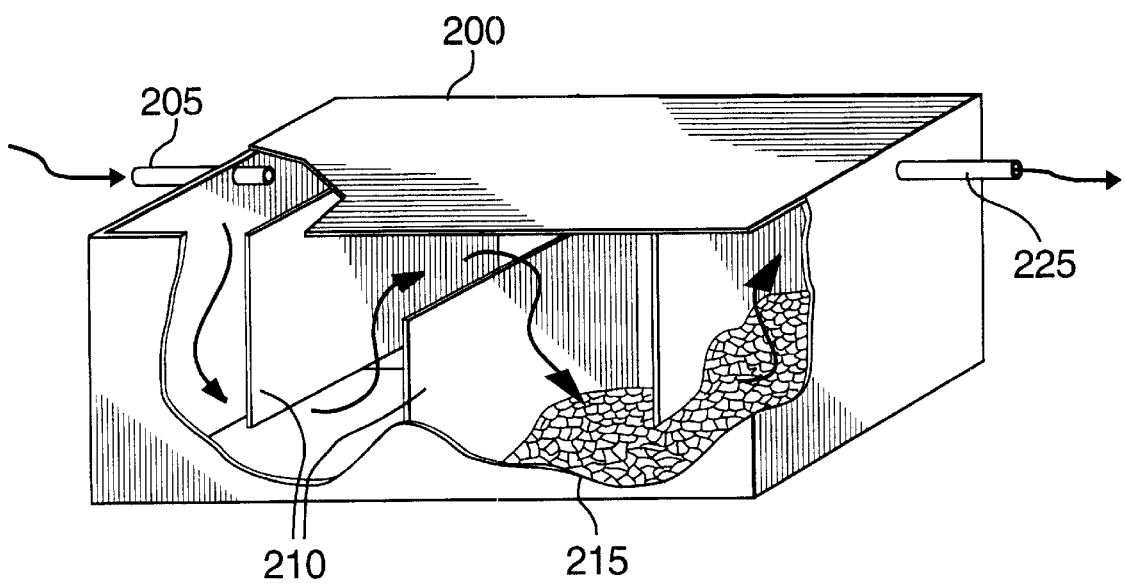
FIG. 4 is a perspective drawing of a water-saturated module for burial or surface installation. Water flow paths are circuitous through the module to maximize contact with the treatment medium.

Function/process of the aerobic module:

Wastewater 130 is introduced to the aerobic module 100 through the inlet 105, into the distribution header 110. The water percolates slowly downwardly through the absorbent medium 115 where treatment is effected, and is discharged through the outlet 125 to another treatment module, such as a water-saturated module 200 as shown in FIGS. 1 and 4, or to the environment.

Ventilation air 145 is preferably brought in through the inlet 150 and is drawn through the permeable medium 115 to the collection header 155, and is discharged through the outlet 170. Alternatively, air may be introduced by a fan or with the wastewater by means of an air-driven pump.

Details of the aerobic module elements—Container.

The container used for the aerobic module 100 is enclosed and made of any suitable material which is preferably impermeable, non-reactive, durable, and structurally sound, such as plastic or concrete.

The container may be of any reasonable shape, and the size of the container is typically approximately 3–5 m3 for a flow of 2000 L/day of potent wastewater. Larger or more numerous modules can be used for larger flows.

The water and air inlets and outlets 105, 125, 150, 170 are through-wall fittings of durable materials such as plastic. are appropriately sized, and are connected by any suitable means.

The inlet 105 is preferably located proximate the top of the module and the outlet 125 is located proximate the bottom, ensuring free drainage of the wastewater through the module 100. When pump dosed, the inlet 105 may be proximate the bottom for convenience or to prevent freezing, although the distribution header will of course still be proximate the top.

The access port 150 should allow for inspection and maintenance and can double as the air inlet for ventilation air 145.

Details of aerobic module elements—Distribution header

Figure 3:
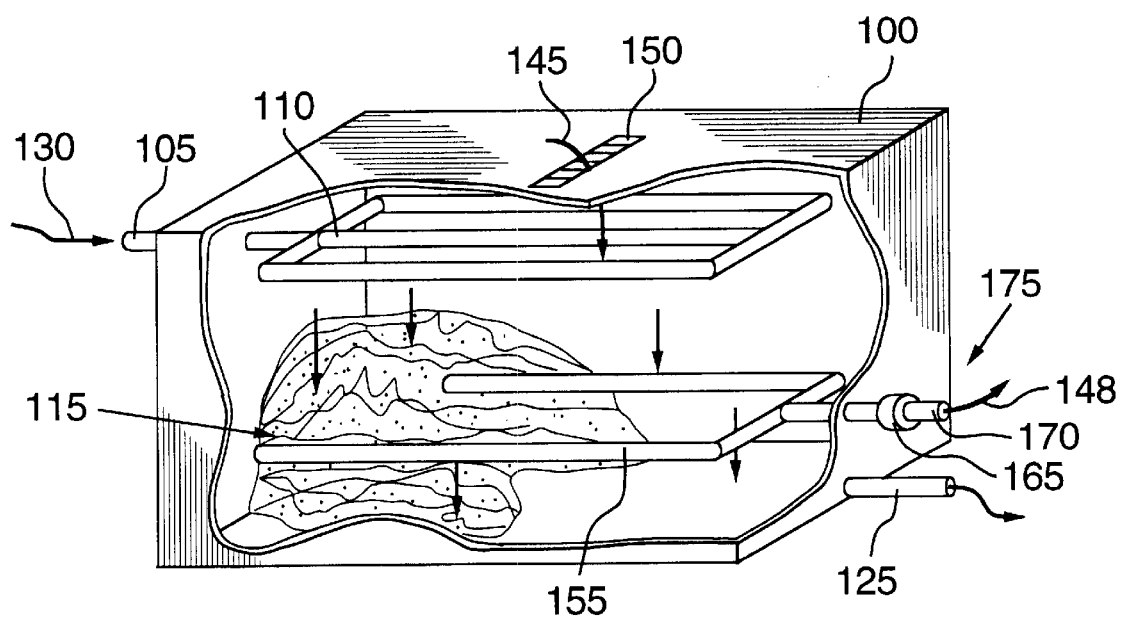
FIG. 3 is a perspective drawing of an unsaturated aerobic module with a low profile designed specifically for burial. Wastewater and ventilation air flow paths through the treatment medium are indicated.

As seen in FIG. 3. the distribution header 110 is a means to distribute the wastewater evenly and directly into the upper portions of the medium 115. The header 110 can be made of perforated tubes of durable plastic such as PVC, appropriately sized, connected by any suitable means and supported by any suitable means. If dosing is by pump or siphon surge, the header 110 can be a series of spray nozzles, preferably discharging onto splash plates (not shown).

The distribution header 110 is shaped and perforations therein are sized and positioned so that the wastewater is evenly distributed onto the medium 115. In another embodiment, the spray nozzles and splash plates in header 110 are arranged to spray evenly onto the medium 115.

Details of aerobic module elements—Structure of ventilation means

The air ventilation means 175 preferably includes a ventilation air inlet 150 (previously described) an air collection header 155, a fan 165, and an air outlet 170 (previously described).

The air collection header 155 is preferably made of perforated plastic tubes of appropriate size, connected by any suitable means, and supported by any suitable means. Appropriate perforations are positioned uniformly along the tubes, such as every 10–20 cm, for example. Durable screen preferably covers the perforated tubes to prevent clogging by the medium 115 which preferably surrounds the header 155.

The air Collection header 155 is shaped so that the ventilation air is distributed as evenly as possible through the medium 115. For example, in field trials of the configuration shown in FIG. 2. a long, narrow rectangular loop of perforated tube was found to be effective in ventilating a long narrow tank, In one embodiment, a fan 165 is located proximate the air outlet 170 to facilitate ventilation of the module 100. The fan 165 can be electric or wind-driven.

In another embodiment, the air ventilation means 175 includes the air inlet 150 or air outlet 170. In another embodiment, the air ventilation means 175 includes an air-driven pump and the air outlet 170.

Function—air flow through media and ventilation system

The ventilation air is brought into the module 100 to sustain aerobic biotic activity within the medium 115 and to aerate the water.

Flow can be directed upwardly or downwardly through the medium 115. but odour in the vented air 148 is minimized if the air flow follows the path of the wastewater. Odour removal can also be effected by passing the discharged air 148 through a de-odourizing media such as natural peat or activated charcoal (not shown).

Details of aerobic module elements—Structure of media

The treatment medium 115 is a means for conveying the wastewater slowly downwardly through the aerobic module 100 and promoting aeration. Water treatment within a module of reasonable size is possible only with the use of medium 115 which has superior water retention and air permeability properties. Preferred materials for the medium 115 include particles of open cellular synthetic foam such as flexible polyurethane foam, modified synthetic foam, sponge, or other similar materials. These absorbent particles transmit water through their interiors by way of the open cells, and also have high water-retention capacity. The particles remain water-saturated, but air ventilation occurs simultaneously through the open voids between the particles. For example, excellent aerobic treatment was attained in laboratory and field experiments with particles of polyurethane foam of mixed sizes ranging generally between about 0.5 and 5 cm. A narrow size distribution of larger particles provides larger and more open void spaces between the particles for ease of aeration, whereas a distribution of small and large particles provides smaller void spaces and more restricted air flow.

The medium 115 does not necessarily require a particulate form, but could rather be a solid stab of plastic foam, for example with aeration conduits formed substantially through it to allow diffusion of oxygen from the conduits to the water contained in the foam interior. This format would ease the fabrication of the aerobic module 100. The size and separation of the aeration conduits would depend on the loading rate and wastewater potency but could be 2 cm in diameter, and distributed through the slab every 10 to 20 cm, for example. To promote ventilation the conduits would preferably be oriented approximately vertically with optional horizontal interconnections.

The medium material preferably should be durable enough to retain these superior properties over the expected life span of the system (e.g., 20–30 years).

Function of the media

The unsaturated aerobic module 100 reproduces the processes of a conventional tile bed in a small, aerobic container 100 (e.g., 3–5 m3 for a typical domicile).

Figure 5:
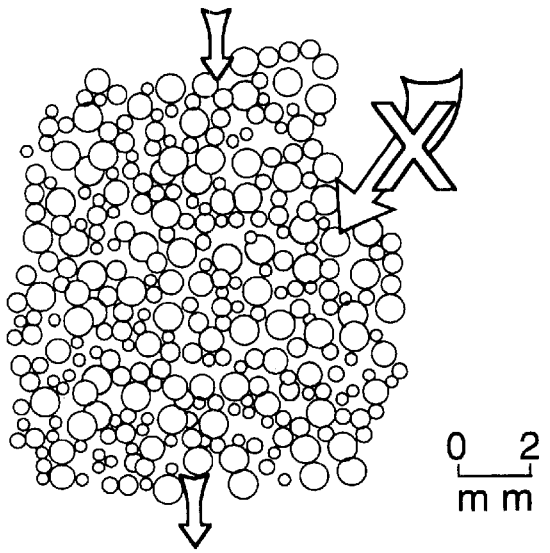
FIG. 5 is a schematic cross-section showing a prior art medium such as sand.
Figure 6:
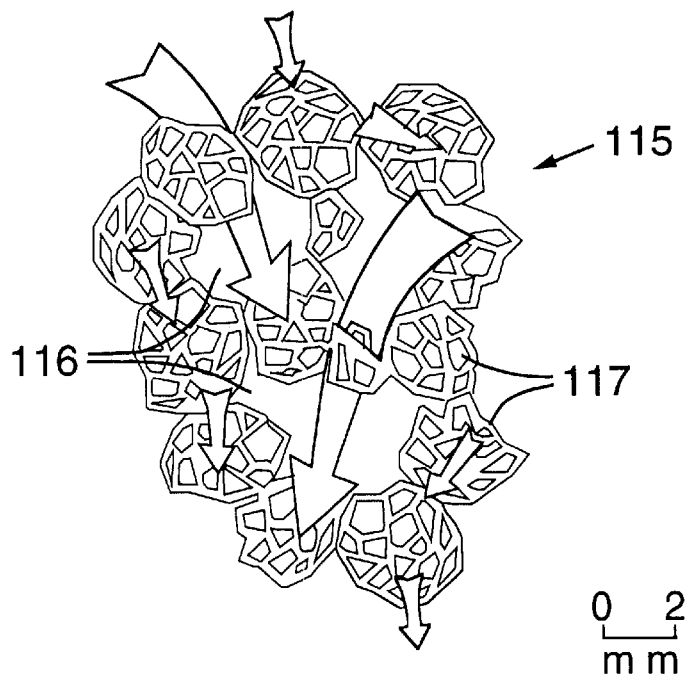
FIG. 6 is a schematic cross-section showing an example of the medium in the present invention.

The medium 115 sustains diverse populations of beneficial biota by providing protection from desiccation, extreme temperatures, and washouts by increased flow of wastewater. As can be seen from FIG. 6, the medium 115 allows entry of ventilation air through the large air-filled void spaces 116 between the water-filled foam particles 117 (or through the aeration conduits in the case of solid foam blocks), provides nutrient-rich wastewater to sustain the biotic populations, and retains it long enough to be thoroughly treated in the biofilter. In FIG. 6, the large arrows illustrate air flow through the voids, and the small arrows illustrate wastewater flow through the particles. By contrast, as can be seen from FIG. 5 (prior art), ventilation air cannot flow, since the space between particles is filled with the wastewater.

Basic structure of the saturated module

The saturated module, shown in FIG. 4, includes a container 200, and a treatment medium 215 and preferably vertical flow baffles 210. The structure of the container 200 includes a water inlet 205 and a water outlet 225.

The flow baffles 210 are preferably fastened to the interior walls.

The treatment medium 215 substantially fills the module.

The module 200 can be placed either adjacent to or under the aerobic module 100 as desired or as space limitations demand.

Function/process of the saturated module

The saturated module 200, if used, receives aerobically treated water through the water inlet 205 and guides it through the treatment medium 215 around the flow baffles 210. and discharges it through the outlet 225. The circuitous flow path maximizes exposure of the water to the medium 215.

The saturated module 200 promotes anaerobic biological activity to remove additional undesirable constituents discharged from the aerobic module 100.

The saturated module 200 is convenient for a biotic removal of phosphate and other contaminants, although an anaerobic environment is not a requirement.

The saturated module 200 is a self-contained, water-saturated module containing media conducive to the growth and maintenance of beneficial anaerobic bacteria and biota. Water is passed to it at a rate sufficient to allow the media to retain the effluent to further treat the water before displacement by additional aerobic effluent.

Details of the saturated module elements—Container

The container used for the saturated module 200 is made of any suitable material which is preferably impermeable, non-reactive, durable, and structurally sound, such as plastic or concrete.

The container may be of any reasonable shape, and the size of the container should be adequate for a residence times of about 1 day.

The containers require an access port (not shown) with a removable cover for filling and inspection.

The water inlet and outlets 205, 225 are through-wall fittings of durable materials such as plastic, are appropriately sized, and are connected by any suitable means The inlet and outlets 205, 225 are proximate the top of the container to maintain saturated conditions. The inlet 205 brings aerobically treated water into the saturated module 200.

Durable screen preferably covers the inside of the inlet and outlet 205, 225 to keep the medium 215 inside module 200.

Details of the saturated module elements—Structure and function of the media

The treatment medium 215 includes any natural or artificial material which promotes biotic and a biotic treatment under water-saturated conditions, and which is sustainable over the expected life of the system (e.g., 20–30 years).

Removal of phosphorus from wastewater is an a biotic chemical reaction process which occurs when dissolved phosphorus reacts with calcium carbonate to create a calcium phosphate mineral. Crushed limestone can therefore be used as a treatment medium 215 to remove phosphorus. Phosphorus is also adsorbed onto iron oxy-hydroxides in acidic conditions, and therefore certain crushed iron ores, pellets, or similar material can be used as treatment media. Organic solvents can be absorbed onto media such as coal particles which may be mixed with other media in the saturated modules. Foam particles may be mixed in with the reactive media to promote microbial populations.

Polluted water treatment

This is an additional use using the same apparatus.

The aerobic module 100, with or without the saturated module 200, can be used to renovate polluted water for domestic consumption. inorganic matter such as clay and mud is first removed by any suitable conventional filtration means. Laboratory experiments show that at 20° C. coliform bacteria are reduced by 5–6 orders of magnitude in <1 m thickness of polyurethane foam medium 115. The medium 115 acts as a physical filter as well as a biological filter, and is able to retain and remove larger harmful biota, such as Giardia cysts. Tropical climates are ideal for this invention and are the areas where water-borne diseases are most prevalent.

Summary

The invention provides a means for single-pass aerobic treatment of potent wastewater at high loading rates in a small, contained and transportable volume, by way of a special absorbent filter medium and ventilation means. The aerobically treated water can be collected and further treated in water-saturated modules to remove undesirable constituents such as nitrate and phosphorus. The invention is independent of the natural environment and does not require high maintenance mechanical devices. Anaerobic septic tank effluent is an obvious wastewater source for the invention, but any water containing undesirable biodegradable matter can be treated, such as polluted surface water. The apparatus can be placed above or below ground and is equally effective in all drainage and soil or rock conditions, even conditions which are inappropriate for conventional or engineered tile beds.

Accordingly, advantages of the invention are possibly that the wastewater treatment system may; (1) allow thorough and flexible treatment of domestic wastewater and certain industrial wastewaters, including aerobic and ensuing treatments in successive modules, independently of soil type, precipitation, and drainage conditions; (2) treat polluted surface water or groundwater for disposal or for subsequent use; (3) treat the wastewater in a small-volume aerobic module by using absorbent particles instead of solid particles; (4) not require a large lot, and not remove any land from use when buried: (5) be low-technology, low-maintenance, and easily installed by semi-skilled workers, and not rely on mechanical devices or chemical additives, although either could be included; (6) not depend on a particular tank shape, size, or composition for the treatment modules, and may use common, sustainable, and inexpensive materials for the modules and for the aerobic and saturated treatment media; (7) be customized to treat a particular type or volume of wastewater by adding a particular treatment module or by linking modules together; (8) be connected directly to a conventional septic tank for easy retrofitting and not require special plumbing in the house or building; (9) be a factory-made standardized product for predicable performance, ease of inspection and approval, and is easily transportable; and (10) be installed above ground or below ground, may be disguised with attractive panelling or wall covering, may be shaded easily from the sun, and may be insulated and heated easily in permafrost areas.

It should be recognized that not all of the above advantages will necessarily be achieved simultaneously in any given installation.

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, although the above description refers to the aerobic and saturated modules being defined by containers, it should be readily appreciated that in some soil conditions, it may be acceptable to simply excavate a containment volume, defined by the walls of the excavation, and position and support the various components within that excavated containment volume, with a suitable cover or lid being provided.

It should also be appreciated that although the preferred embodiment of the invention contemplates combining aerobic and ensuing treatment stages, an aerobic stage only may be sufficient for certain applications. As described, the module containing the treatment medium serves as an aerobic treatment station. Waste water treatment systems operate by passing effluent water from a septic tank to an aerobic treatment station. The effluent is polluted with ammonium, organic materials, and other material; these pollutants are of the type that can be broken down by oxidation into harmless, or relatively harmless, substances, and it is the function of the aerobic treatment station to achieve such oxidation in a cost-effective manner.

In a preferred form of the aerobic treatment station, the treatment medium comprises foam material of the type which is like a soft sponge that is to say, the material is elastomeric, flexible, soft, and resiliently deformable.

The soft foam material is of the type that has an open cellular structure, the cells being interconnected. The size of the cells is important; the cells are so small that water present in the cells is retained in the cells by sponge action—that is to say, by action in which water is retained in the cells by surface tension, and is spread from cell to cell by capillary action.

It follows that the cells are so small that water substantially does not drain from the cells, whereby the foam material remains substantially constantly saturated with water. The larger the cells of the foam, the more it would become possible for water to drain out of the cells, and particularly so if less water were to be dosed into the body of foam material.

Preferably the foam is of the type in which the (interconnected) cells have an average diameter of less than 0.5 mm, and the upper limit is about 1 mm in average diameter. When the cells are as small as this, it is found that the sponge action of the foam is effective to spread the water throughout the body of foam, and to maintain the foam in a saturated condition. The small cells act to draw water sideways, and even upwards, from cell to cell through the foam material.

It is generally found that water cannot be relied upon to support itself in a cell or other space that is more than about 2 mm wide, and is liable to drain out of such a large cell.

For proper promotion of the aerobic treatment reactions, the foam material contains voids and open spaces. These voids are interconnected, whereby air can circulate freely through the voids.

It is important that the voids in the body of foam be large, free, and open. If the voids were to impose any restriction to the circulatory flow of air through the body of foam material, then the air circulation flow through the body of foam would tend to develop preferred pathways, whereby the airflow to the zones of the body of foam will gradually start to become uneven. It should be noted that once the air starts to form preferred circulation pathways, there is a snowballing effect, ie the effect does not correct itself.

To avoid the initiation of pathways, the voids, and the interconnecting spaces between the voids, therefore should be so large that no air pressure differentials can build up between the air in one void and the air in another void: only when the voids are large, and when the interconnecting spaces between the voids are large, can the air circulate freely over the whole body of foam material without developing any pressure differentials.

Thus, the voids and spaces must be large in order to make sure the air reaches evenly over all zones of the body of foam material (and do so over a service life of many years).

The voids and spaces should be large also for another reason, which is that they must be large enough to allow water to drain out of the voids and spaces. Just as the sponge-cells in the foam material should be small enough to ensure that the water does not drain out of the cells, so the voids and spaces in the body of foam material should be large enough to ensure that the water does drain out of the voids and spaces. The actual foam itself remains saturated with water: the voids and spaces remain open and clear of water, whereby air circulates therethrough.

If the voids and spaces are large enough to ensure an even circulation of air throughout the body of foam, the voids and spaces will inevitably will be large enough to be self-draining.

The body of soft foam should not be constituted as a heap of separate blocks of soft foam material, and not in the form of a single slab of soft foam, the voids and spaces then taking the form of holes let into the soft slab. If the holes are moulded in, a skin of reduced permeability tends to develop during the moulding process at the surface defining the hole. Such a skin would not be present if the hole were made by drilling or cutting, but cutting holes in a slab of soft foam is not a simple technique of mass production.

The body of soft foam is constituted not from a single slab of soft foam, but by providing many pieces or blocks of soft foam, and arranging the blocks in a heap. The blocks may be of any shape, so long as the blocks tend, when heaped, to create large voids and spaces between the blocks. Blocks in the form of cubes, when heaped randomly or haphazardly, will form acceptable voids and spaces (arranging cubes in neat, regular, rows however will not result in acceptable voids and spaces). The designer should aim for the voids and spaces to constitute 30 or 40 percent of the volume of the body of foam material. Such a proportion obtains when the blocks are spherical, for example (although the spherical shape is hard to manufacture): or the blocks may be of an easy-to-cut angular shape, such as cubic, so long as the blocks are not deliberately arranged in neat rows.

An irregular and angular shape may be used, but the designer should see to it that the blocks are not of a shape whereby the blocks would physically interlock, and the shape of the blocks should have no re-entrant angles, as this also would lead to the voids and spaces being too small.

The provision of the heap of separate blocks of soft foam is preferred over the single slab of soft foam because a heap of blocks automatically provides voids and spaces of the desired openness and interconnectability. In the one-piece slab of soft foam, providing such adequate voids and spaces would be difficult and expensive from the manufacturing standpoint.

Preferably the separate blocks of soft foam should all be of the same size. If of different sizes, the smaller blocks would tend to fill in the voids and spaces between the larger blocks.

Open and free though the voids and spaces may be, of course air circulation through the voids and spaces in the body of foam material would be reduced if the air could simply bypass the whole body. Therefore, the body of foam material should be so placed that the circulation air is constrained to move through the body. One way of doing this is to house the body of foam material in a container, and to arrange for the air to move downwards (or upwards) through the body. This measure requires that the sides of the body of foam material be at least rudimentarily sealed to the container.

When the body of foam material is constituted by a heap of separate blocks, the blocks will naturally settle against the sides of the container, and the required degree of sealing will be achieved: that is to say, air will not be able to by-pass the voids and spaces by passing between the sides of the body of foam material and the sides of the container.

It may be noted that a block of rigid foam would not be self-sealing against the sides of the container, and rigid foam is therefore not acceptable for that reason.

The blocks of soft foam in the heap touch each other at places of contact. Because the blocks are soft, resilient deformation of the blocks occurs at the places of contact. In fact, by definition, the blocks are acceptably soft if the blocks do substantially deform at the points of contact: bearing in mind that the blocks will tend to deform more when the heap of blocks is laden with water. Blocks of rigid foam, on the other hand, would not, in substance, tend to deform at the places of contact.

The resilient deformation of the blocks of soft foam at the places of contact means that each place of contact occupies quite a large area. If the blocks were of rigid foam, the places of contact would tend to be little more than points. Because they are soft, the soft blocks therefore each have a large area available for water transmission between the block and its neighbors. Accordingly, water can transfer from block to block much more readily when the blocks are of softly resilient foam, than when the blocks are of rigid foam. Just as it was important that the air could circulate freely throughout the whole body of foam material, so it is important that the water also can travel to, and keep saturated, all the foam blocks making up the body of foam material.

When the body of foam material is a heap of separate blocks of soft, resilient foam, the aerobic treatment of the water can be at its most cost-effective. The voids and spaces between the blocks are large enough to ensure that air can circulate fully through the whole body of foam material, whereby every zone of the body of foam material is contributing towards the aerobic treatment to its full potential. Equally, because the foam material has such small cells, and has such good hydraulic transmissibility block-to-block, also each zone of the body of foam material is saturated with water, and also contributes to its full potential. The large voids ensure that air circulation is even over the whole body, and the small cells and good transmissibility between cells ensures that the water is evenly distributed over the whole body.

In other types of aerobic treatment stations, the aerobic reactions inevitably come to take place in preferred zones, and the "dead" zones of those station tend to become more so as time goes by. In the aerobic station as described, neither the throughflow of water, nor the throughflow of air, tend to settle into preferred zones, but rather are spread throughout the whole body of foam material. It follows therefore, that the volume of foam material needed to accomplish a given level of treatment is at a minimum when the foam material is softly and resiliently deformable when the body comprises a heap of separate blocks of the soft material, and when the cell size is around 0.5 mm.

It will be noted that the voids and spaces created between the blocks when the blocks are heaped into the container are created automatically, at zero cost. No drilling or internal cutting operations are required to form the voids (which would be very difficult in soft foam). The blocks themselves may be manufactured by slicing up a slab of soft foam into cubes, or by tearing blocks from the slab, although by this latter method the blocks are not all the same size.

It may be noted also that the voids and spaces created by randomly heaping the blocks settles to the 30 or 40 per cent of total volume figure, as mentioned, which, it turns out, is Just the right size proportion to promote the excellent air circulation characteristics as described. Not only are the voids created automatically, but the voids created are of just the right size, automatically, and for nothing.

The designer should pay attention to the size of the blocks of soft foam material, if the blocks are too large, air cannot reach the centres of the blocks, whereby the centre zones of the blocks might not then be able to play a full part in promoting the aerobic reactions. The designer should aim to have all locations of the body of foam material contributing fully to the reactions, because that is when the efficiency of the aerobic treatment station is a maximum. When both the air and the water are distributed equally, efficiency is at a maximum.

If the blocks are larger than about la cm across the centre zones of the blocks can start to lose some effectiveness. Preferably, the blocks are 5 cm cubes. The blocks can be smaller than that, but there is little advantage to having smaller blocks.

The foam material should remain saturated substantially all the time. In that case, the water remains more or less static in the body of foam blocks during periods when the heap of blocks is not actually being dosed with water. As a new charge or batch of water is dosed onto the heap of foam blocks, the water already present in the heap percolates down the heap. Eventually, the water emerges from the bottom of the heap. Between charges, the water substantially does not move; because of the small cell size (the bacteria which cause the oxidation reactions live on the cell walls) all the water is in close, intimate contact with the bacteria, and the biochemical reactions can proceed efficiently.

The residence time the water spends in the heap is fairly constant provided the through-flow of water remains constant, day to day. The designer should aim for a residence time of the water in the heap of foam blocks of about a day, or a little longer to cater for the contingency of occasional over-use of the system. Thus, the body of foam should be around 1500 or 2000 liters for each 1000 liters of water per day. (When the voids and spaces account for 35 percent of the volume of the heap, a heap-volume of 1500 liters corresponds to a foam volume of about 1000 liters.)

The dosing of the water onto the heap of foam blocks can be done as a constant trickle of water, rather than as periodic batch doses, but that need make no difference to the average residence time of the water.

The designer should see to it that the water is spread out evenly over the top surface of the heap. Although the soft foam blocks give excellent sideways, and even upwards, spreading of the water, as described, dumping all the water into the heap at one point would lead to the water starting to create preferred pathways, with the inefficiencies that result therefrom.

As mentioned, it is preferred that the blocks are formed by cutting rather than by moulding. Moulding tends to leave a skin on the moulded component, which affects water transmissibility, and also affects the viability of the aerobic bacteria upon which the treatment station relies.

Soft polyurethane foam material is found to be almost ideal as a growth substrate for aerobic bacteria, especially when the surfaces are cut (or torn) rather than moulded. The bacteria inhabit the cells, where they not only have a physically protective environment, but the organic materials they need, and the air they need, is presented directly to them, not by flushing over them, but by being brought to, and held in, intimate contact.

With soft polyurethane foam, the surface texture inside the cells is also excellent; especially as compared with, for example, the texture of the cell walls of a rigid foam, where the surface of the material tends to have a somewhat glazed finish, which is not ideal for promoting the rapid and widespread establishment of bacteria. Soft polyurethane foam, with cells of about 0.5 mm, as mentioned, and with air circulating through clear open voids and spaces between the blocks, is effective not only to retain water evenly over the whole body of the foam material, but is also effective to cause the establishment of highly viable bacteria evenly throughout the whole body.

A typical small domestic septic tank sewage treatment system deals with perhaps 1000 liters of waste-water per day, on the average, which requires about 1500 liters of foam blocks. It will be noted that an aerobic treatment station comprising 1.5 cubic meters (1500 liters) of soft foam blocks can be expected to be substantially completely effective in breaking down all the oxidizable pollutants present in the water. This may be compared with the comparatively enormous size of a typical conventional aerobic tile bed, sand bed, or aerobic soakaway, for that volume of polluted water.

If a conventional sand-filter type of aerobic station were provided, for example, many tonnes of sand would have to be trucked to the site, not to mention the excavations required, the in-ground plumbing, and all the other expensive preparations. Whilst a properly sized and installed sand-bed aerobic treatment station can be the equal in performance of the soft-foam-blocks aerobic treatment station, the soft-foam-blocks station is much less expensive in materials, and requires little in the way of plumbing and in-ground excavations.

A key advantage of the fact that the foam blocks are soft and resilient is that the heap of blocks can be compressed for transportation purposes. Thus the material needed for a highly effective aerobic treatment station, instead of comprising several truckloads of sand, comprises polyurethane foam compressed into a small package which can be picked up and handled by one or two persons, and can be transported long distances, even by air to remote locations, with very little cost.

The soft polyurethane foam can be compressed and packaged directly at the place it is manufactured, if desired. The soft foam can be compacted and stored in vacuum packs.

It may be noted that rigid foam cannot be compressed for transport and storage.

Also, if a sand bed should become clogged due to an accidental overload, the sand must be dug up. The soft foam blocks are much less likely to become clogged than sand, but even of that did happen, the foam could be cleaned or replaced with little difficulty and expense.

When the body of foam material comprises a heap of soft foam blocks, as distinguished from a one-piece slab of hard or soft foam material, the pressure in the water dug to the hydrostatic pressure head is different. In a one-piece slab, the pressure of the water in the foam cells at the bottom of the slab can be expected to be considerably higher than the water pressure in the foam cells at the top of the slab. When the foam is in the form of a heap of separate blocks, and when there is good hydraulic transmissibility between the (soft) blocks, the pressure differences due to vertical height can be expected to be much reduced. That is not to say that the in-cell water pressure will be even or equal over the whole height of the heap of soft foam blocks, but rather that the pressure differences will be smaller. Thus, again, the heap of separate soft blocks of foam is in keeping with the general aim of maintaining conditions over the whole body of treatment material as even as possible, at least as compared with a one-piece slab of foam.

If hydrostatic pressure differences over the height of the heap are seen to be a problem (and the velocity of movement of the water through the cells depends on the pressure) the blocks may be of different densities: for example, the blocks of foam at the bottom of the heap may be of smaller cell size than the blocks of foam at the top. It may be noted that grading the densities of the foam would be difficult if the foam were in the form of a single slab, rather than separate blocks.

The circulation of air through the voids and spaces between the soft foam blocks preferably should be assisted by a fan. In tests, the following results have been obtained, in the case of an aerobic treatment station using blocks of soft foam, the concentrations in the influent water being compared with those in the effluent water;

Natural air circulation, no fan:

BOD: concentr'n fell to 6.5 percent total coliform: concentr'n fell to 0.015 percent fecal coliform: concentr'n fell to 0.005 percent Excellent though these results are, the results from using forced ventilation (with a fan) are even more spectacular:

Forced ventilation, using a fan
BOD: concentr'n fell to 1.6 percent
total coliform: concentr'n fell to 0.002 percent
fecal coliform: concentr'n fell to 0.0001 percent The percentage of Ammonium-Nitrogen that oxidized to Nitrate-Nitrogen was also considerably increased when the fan was used.

In these tests the loading rate of polluted water into the heap of soft foam blocks was high, is 80 cm/day. (80 cm/day is 80 cu-cm of water per day per sq-cm of the cross-sectional area of the heap of foam blocks.) The polluted water used for the test was effluent from a septic tank; it may be noted that such a high rate of flow of septic tank effluent into a sand filter would clog the sand filter very quickly. In tests with the soft foam blocks, tie loading rate has been as high as 150 cm/day without signs of clogging.

The soft foam blocks cannot be expected to cope with greases and fats at such loading rates, and should be protected from overloading thereby. However, the high-performance soft-foam blocks, especially when forced-ventilated, can be expected to cope with an increased proportion of solid (organic) material in the septic tank effluent.

The temperature in the aerobic treatment station is important in determining the efficiency of the biochemical reactions. Below about 5 deg. C. the biological reactions substantially close down. The oxidation reactions, when they are occurring, produce heat and steps may be taken to conserve this heat, and use it to maintain a good temperature within the aerobic treatment station even in cold weather.

To conserve the natural heat generated in the station, the station is enclosed, and the air, instead of being exhaled from the station and replaced with fresh air, is recirculated around the enclosure, preferably by means of a fan or other air-circulation means. The oxygen in the air is gradually used up in the biochemical reactions, and a small make-up entry of fresh air may be provided. (However, it would take many months for the air actually to become depleted of oxygen to the point of affecting the reactions.) Enclosure of the air and forced re-circulation of the air can be expected to enable the aerobic treatment station to give good results even in a cold climate. In a hot climate, the biochemical reactions take place naturally much faster and are more efficient.

Although air has been referred to, it is contemplated that oxygen gas might be used in place of air, especially when the gas is enclosed and re-circulated.

The soft-foam-block aerobic treatment station has been described as it relates to the treatment of effluent from a domestic septic tank. However, the station as described is generally applicable in the case of any system that has an aerobic treatment requirement. Many industrial processes have water effluent where oxidation is needed for remediation, and the station as described may be considered in those cases. Also, in the case of sites such as land-fills and other waste-dumps, where water passing out of the site contains leachate that should be addressed by oxidation, the aerobic treatment station as described may be considered.

The designer should see to it that water does not flood the heap of soft foam blocks. The blocks themselves should remain saturated at all times, but the voids and spaces between the blocks should be clear and open at all times; when the water has drained down from the heap of blocks, it should be conducted away, and not be allowed to build up a level in the bottom of the heap. The container should therefore be equipped with a water outlet, and a means for conducting the effluent water through the outlet, and away.

The container for the heap of soft foam blocks preferably should comprise a (waterproof box, the soft foam blocks being heaped therein. The blocks touch the sides of the container, so that air cannot pass around (rather than through) the heap. A suitable rack may be provided in the bottom of the container to hold the blocks clear of the floor of the container. A plenum chamber is thus created under the rack, which is useful for ensuring good control of the circulating air, and this chamber also serves to receive water dripping from the blocks of soft foam. The water outlet is a pipe leading out of the chamber. If the air is to be recirculated, the top of the chamber is enclosed, although small ventilation holes may be left to admit the make-up air.

It will be understood that the water outlet contains all the effluent water from the aerobic treatment station. This fact is advantageously made use of, as described previously, in that the effluent can be conveniently conducted or conveyed through the outlet, along a conduit, and into a further or subsequent treatment station.

Thus the waste-water passes through a series of treatment stations -a septic tank station, an aerobic treatment station, and then one or two subsequent treatment stations, as have been described, and the waste-water is not released into the groundwater until it has passed through all the stations. The subsequent treatment stations will now be further described.

Once the oxidizable pollutants are gone, it becomes possible, or simpler, to remove other contaminants. Also, new contaminants may have been created by the oxidation reactions in the aerobic station, and these may need to be addressed in subsequent treatment stations.

The water passing through a septic tank includes not only toilet flush debris but also washing debris and detergents, and other organic and inorganic substances that preferably should not be allowed to escape into tie groundwater Phosphate/phosphorus, for example, should be addressed, if possible.

Phosphorus can be removed from the effluent from the aerobic treatment station by passing the effluent through a body of crushed limestone, iron or aluminum hydroxides such as crushed red bricks, red coloured sand, ("red" being the colour associated with iron, i.e reddish and inclining to orange or yellow) or specialty configured media.

In the subsequent treatment stations, which include a body of treatment material, the body of course must be permeable or porous enough to permit the effluent water to pass therethrough. Equally, the body must be sufficiently retentive to make sure the chemical and biochemical reactions can be completed. Throughflow rates are determined by the grain size of the porous media, and of course by the volume of material present.

A key to the advantageous utilization of the subsequent treatment stations is the provisions of the in-series station-to-station transfer of all the waste-water. The whole system is single-pass, and is highly effective although of low cost and minimal installation requirements.

In fact, one way in which the subsequent treatment stations can be made use of is as an after-fitment to an existing septic tank installation. For example, consider the case of an existing waste-water treatment system, in which a septic tank outflows into a tile bed or sand filter, and the water then passes into the ground. Such an installation may be on the shore of a lake, and may be passing nutrients such as phosphorus and nitrates into the lake in unacceptable quantities, but little can be done to rectify the situation using conventional technology—certainly not without huge expense.

In such a case, the existing tile bed, with all its restrictions and the inconveniences which limit what can be done with the water, is simply abandoned. Its function is now carried out, preferably, by the soft-foam-blocks aerobic treatment station as described. This station is very economical to obtain and to install.

Once this type of aerobic treatment station is in place, the addition and installation of the subsequent stations is then very convenient. It is a simple matter to couple the subsequent stations up to the soft-foam-blocks aerobic station, because the effluent water from the sot-foam-blocks aerobic station is already contained in a conduit.

The subsequent treatment stations preferably are housed in containers which do not interact with the ground or with the atmosphere, whereby again the system is simple to install, and also there is the advantage that the system can be almost wholly constructed in a factory and shipped to the installation site—unlike a tile-bed, for example, which has to be built at, and into, the site.

The fact that phosphorus and other nutrients can now be economically and effectively removed from waste-water is a factor in allowing regulations to be introduced to reduce the continued dumping of nutrients into lakes and groundwater.

As mentioned, phosphorus can be removed from the water in a subsequent treatment station using the porous/permeable treatment materials described. Nitrate can be removed from the water in a similar way.

For removing nitrate, the nitrate-laden water is passed through a porous/ permeable body containing organic carbon, under conditions of oxygen exclusion; under such conditions, nitrate is reduced to nitrogen gas by biological action. The organic carbon can be wood shavings, shredded paper, cardboard, sawdust, corn cobs, or the like.

The organic carbon may be derived from liquid sources such as methanol, which may be injected as required, in suitable doses, into the water being treated. Methanol is useful because the bacteria that utilize methanol can also de-nitrify. Molasses, in either dry granule or liquid form is inexpensive and non-toxic, and could easily be adapted for use at a communal system or leachate treatment system where there are facilities for responsible maintenance.

The organic carbon for the nitrate reduction station may also be derived from a small portion of the waste-water (3–5%) from the septic tank, which by-passes the aerobic treatment station. A portion of the nitrate is treated by this by-pass, water, with no visible change in BOD and TSS. but with more coliform bacteria in the effluent.

Other materials have also been found to be suitable for reducing nitrate under anaerobic conditions. Nitrate can be removed by passing the water through a tank containing native iron, as long as protons are added. This can be done by adding an acid, or by adding less organic matter. The acid can be silicic acid, which is preferred because it is a slow-reacting solid. Pyrite, FeS, can serve as a reductant medium for remediating nitrate.

The nitrate reduction station is a second subsequent treatment station which is provided in addition to the first subsequent treatment station for treating the phosphorus, and again it may be noted that the water is simply passed from station to station, in series, along a conduit.

Whether the water has to be pumped along the conduit depends on the lie of the land: the point is that the stations are enclosed, and the water is confined in the conduit when not in the stations, which is what makes it possible to create the station-to-station in-series treatment system. The water emerging finally from the last treatment station is substantially fully treated, and is clean enough to be dumped in the lake or groundwater, and the system is such that no water has left the system prior to that.

Another development of the subsequent treatment systems may be described as follows. Generally, the subsequent treatments require the exclusion of oxygen, and a convenient way in which that can be achieved is to keep the treatment material under water. However, this can lead to its own problems.

For example, if water is left in contact with wood for a long period (eg a few days) the mixture can become too anaerobic, which can lead to the formation of methane and such unfortunate by-products as hydrogen sulphide. This can happen when the flow of water is interrupted and the water remains stagnant in contact with the wood. Another detriment is the additional leaching of tannins, etc, which increase the BOD excessively and give the water a dark, tea-like colour.

It is preferred therefore, not to let the water reside in contact with wood, under oxygen-excluded conditions, for long periods without moving. In this case, therefore, it is preferred not to place the wood actually under water, but rather to pass the water over the wood, whereby the water can drain from the wood, or at least the water can drain from the wood to a sufficient extent that the water does not have the time to become overly anaerobic during periods of non-movement of the water.

However, since the reactions in the nitrate reduction station require the substantial exclusion of oxygen, of course the wood chippings cannot be allowed to become exposed to the air. In fact the wood chippings must be covered. Natural convection has to be minimised as that too might lead to oxygen being admitted. A layer of foam placed over the wood chippings (and another layer of foam placed under the wood chippings) serves to keep air out. The foam should be saturated with water to give an effective seal, and the layer of foam is so sized as to seal against the sides of the container. Tests show that substantially complete de-nitrification occurs, even though the wood is not actualy under water, provided the wood is sealed from the air.

The container or tank in which the nitrate reduction is carried out may be an excavated hole, lined to keep groundwater out. The container or tank can be a built-in addition to the container for the soft-foam-block oxidation treatment medium, when that is convenient.

In the oxidation treatment station, preferably, the foam is provided in such a manner that, at least in the vertical sense in which water travels down through the foam material, the water encounters foam blocks of comparatively-large volume, alternating with comparatively-narrow throats or constrictions between the foam blocks.

When a lower portion of a block of open-cell foam or sponge is in water, capillary action draws water into the cells of the foam block, including into cells in areas of the block that lie above the water level. If the foam block is later taken out of the water, the water drains out of the block.

The volume of water that is retained in the blocks is affected by the configuration of the blocks; especially, the amount of water retained is affected by whether the block has a narrow throat or constriction, through which the water must drain. In that case, some force (pressure differential) is required to overcome the resistance of the constriction, to allow the water to drain through the constriction. If the constriction is tight, the forces acting to hold the water up in the block, due to capillary sponge action, can be larger than the forces that would be needed to cause the water to drain away; in that case, the water (i.e some of the water) is retained in the block. It may be regarded that the tighter the constriction, the greater the volume of water that will be held up in the foam block, above the constriction.

Thus, the configuration of alternating blocks and constrictions means that water drains only partially out of each block. How much water is retained in each block depends on the amount of drainage constriction from that block.

The constriction should not be so tight that water in the foam block cannot drain out at all, because then the water retained in the interior of the block would become stagnant. On the other hand, the constriction should be tight enough that, when the foam block has drained to its fullest capability, still a substantial volume of water remains in the block. If the average water retention in the blocks is at least about 25% of the total volume of the foam, significant breakdown action, as described herein, can be expected to occur.

The water thus retained in the foam blocks may be regarded as being up in the air. That is to say, the blocks are not underwater, but are exposed to the air circulating in the voids and spaces between the blocks. The voids and spaces should be kept clear and open, to permit free circulation of air around and between the blocks. Thus, because the water is held up, in the foam blocks, the volumes of water in the blocks continue to be exposed to the air, and aerobic breakdown reactions of the water at the surfaces of the blocks continues. This action continues even when the water is stationary. Also, the water in the interior of the blocks is shielded from exposure to air, whereby anaerobic reactions can occur inside the blocks. The water inside the blocks does not become stagnant however, because the water inside the blocks is flushed out and changed with each new dosing of water onto the blocks.

Thus, the alternating large-volume blocks and the narrow constrictions, together with the open voids and spaces between the blocks, gives rise to a very advantageous manner of treating the water. Because the water is held up in the air between dosings, aerobic treatment continues between dosings; at the same time, because some of the water is retained in the interiors of the blocks, some anaerobic reactions are promoted. As a result, the dosing rate at which water can be treated, before the onset of excessive solids production during treatment, can be increased substantially as compared with what can be achieved with other treatment media.

There are a number of ways of providing the desired configuration of vertically-alternating blocks and constrictions.

Figure 7:
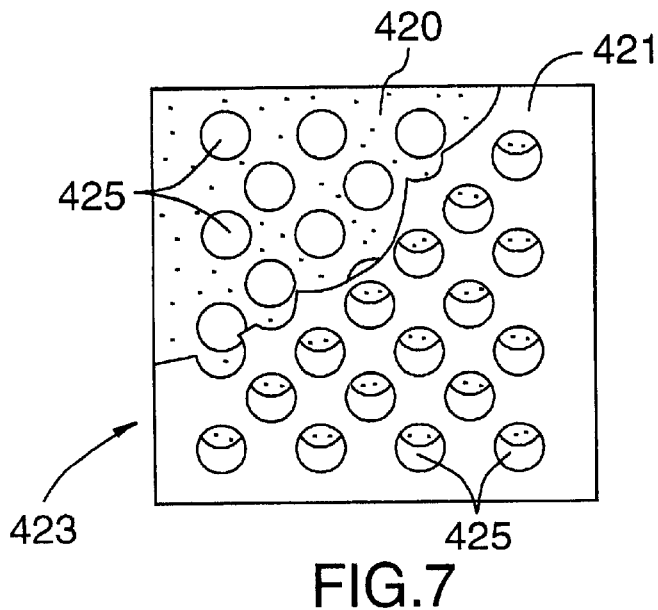
FIG. 7 is a plan view of a treatment medium, comprising a stack of slabs of foam material.

As shown in FIG. 7, the foam material is in the form of slabs 420, each of which lies horizontally, the slabs forming a vertical stack 423. Each slab 420 has vertical through-holes 425, and the holes in one slab partially align with the holes in the slabs above and below.

The slabs rest on each other, whereby slab-to-slab contact is made at various spaced locations at the (horizontal) interface between vertically-adjacent slabs. The places of contact serve as drainage-means whereby water from the upper slab can drain through to the lower slab. However, the places of contact are sufficiently small as to cause a constriction of drainage, whereby some water is retained in the slabs, by capillary action as described. The areas between the holes thus constitute the blocks of foam in which water is retained between dosings.

If the holes 425 in the slabs 420 were to be in vertical alignment, slab to slab, water could just pass straight down the holes, and much of the total volume of the foam material would hardly be wetted. Preferably, as much as possible of the foam should be wetted during dosings, and should retain water between closings, and therefore the holes should not be continuous, slab-through-slab.

Equally, however, the holes 425 should not be dead-ended, and even more so should not be totally enclosed, but should be such as to permit air to circulate freely right through the holes. The partially-overlapping holes 425, as shown, balances these requirements.

Figure 8:
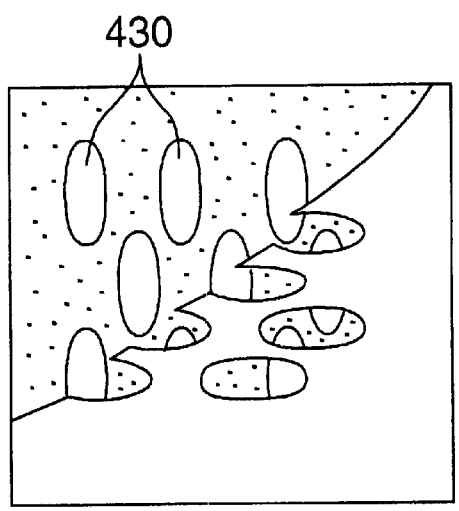
FIG. 8 is a plan view of another treatment medium.

FIG. 8 shows that the partially-overlapping configuration can be achieved by making the holes 430 elongate, and alternating the axes of the holes slab-to-slab.

Figure 9:
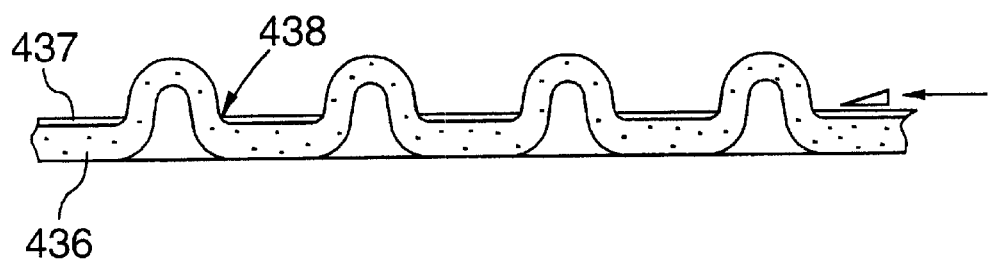
FIG. 9 is a view which illustrates a step in the process of making the foam slabs.

One manner in which the required holes can be formed in the slabs is illustrated in FIG. 9. The foam material 436 is held against a metal plate 437, and the foam material is drawn through holes 438 in the plate, for example by vacuum suction. Then, the protruding pieces of foam are cut off by a knife or saw.

This manner of forming the holes 425 has the benefit, as compared with moulding the holes, that moulding can sometimes produce a skin on the foam, in that the cells at the surfaces of a moulded piece of foam are not so open and interconnected as the cells in the interior. For this reason, it is preferred for the slabs to be cut from large blocks, rather than to be moulded individually, and, as mentioned, it is preferred for the holes to be produced by a cutting process.

As discussed previously, a preferred manner of providing the body of foam is to configure it as a disordered heap of 5-cm cubes of foam. The foam is soft, to the extent that at the contact points between blocks the foam is squashed together, and the water can drain from cube to cube through the points of contact.

Figure 10:
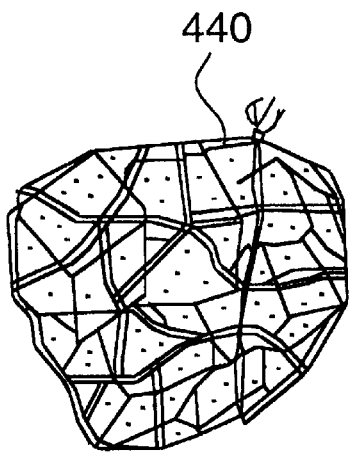
FIG. 10 is a view of a bag of foam blocks.

Many small blocks might be awkward to handle. As shown in FIG. 10, the blocks can be pre-packed, and held in a bag 440, the bag being of a large open-mesh material to provide good air circulation. At the treatment station, the bags are piled on each other to form a stack. The container in which the stack of bags is held is itself open, and permits free circulation of air.

In an alternative construction, the stack of loose-mesh bags is housed in a container that is itself watertight, or sealed. In this case, the designer should take precautions to ensure a good circulation of air over and around the blocks, for example by the use of a fan.

Figure 11:
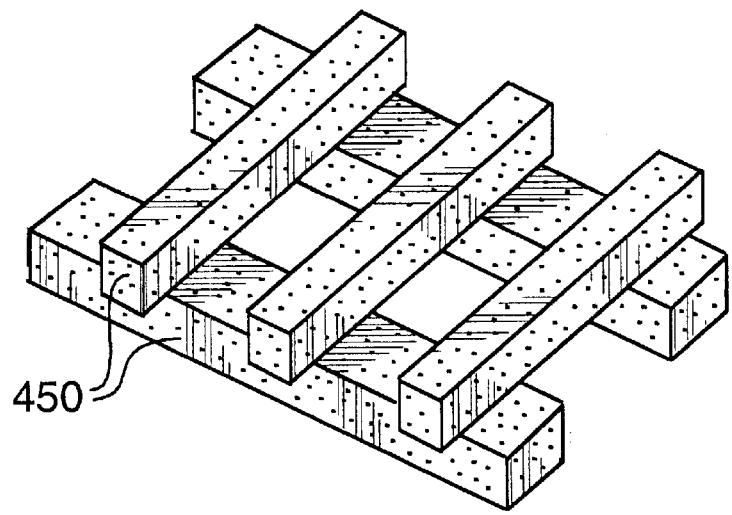
FIG. 11 is a diagrammatic view of another treatment medium.
Figure 12:
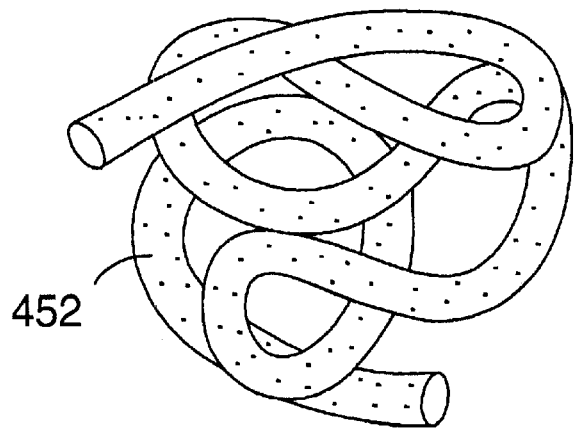
FIG. 12 is a diagrammatic view of another treatment material.

FIGS. 11 and 12 show further configurations that provide the desired alternating blocks and constrictions, and voids and spaces between the blocks. In FIG. 11, short prisms 450 of foam material are laid on each other in criss-cross layers. In FIG. 12, one long prism of foam material 452 is arranged in a sinuous configuration, whereby upper portions of the length of the foam prism are in contact with lower portions of the same prism. Thus, water can drain downwards through the various points of contact, but the drainage is constricted, with the benefits as described.

In another alternative, the foam material is continuous between at least some of the foam blocks, and the drainage-means comprises a neck of the foam material between those foam blocks, the neck being constricted in that the cross-sectional area of the foam in the neck is small, as compared with the cross-sectional area of the foam in the foam block.

Preferably, to ensure the water in the interiors of the blocks does not become stagnant the size and shape of the blocks is such that no point inside the blocks is more than about 5 cm from one of the voids or spaces.

Preferably, to ensure good water retention between dosings, each block of foam material has a point in its interior that is at least 2 cm from the nearest point on its outer surface.

In some cases, it can be advantageous to increase the amount of anaerobic activity taking place within the overall aerobic processes in the system. It may be noted that the promotion of anaerobic activity should not be done at the expense of compromising the overall aerobic activity of the system. That is to say: the micro-biological conversion of ammonium to nitrate by oxidation is the major factor, overall, and that process can proceed most effectively when the water is saturated with dissolved oxygen, and the system should be so engineered that the anaerobic processes can take place without compromising this predominantly aerobic system.

It is recognised that the concentration gradient of dissolved oxygen in water can be steep enough that, although the water on the outside of the block is saturated with dissolved oxygen, the water inside the block just a centimeter or two away) is undergoing anaerobic changes. Furthermore, it is recognised that this change in dissolved oxygen content can be accomplished in a relatively short period of time; short, that is to say, in the context that water does not remain static inside one block all the time, but rather the water travels from block to block, progressively through the whole heap, with on-going dosings, and the water only remains static within the block between dosings. Thus, it may be regarded that the dissolved oxygen content of the water alternates low-high-low-high as the water moves through the heap.

However, of course the blocks have to be engineered, and particularly as to their physical size, in order to bring out the difference between the aerobic and the anaerobic modes of treatment, without the one compromising the other.

Figure 13:
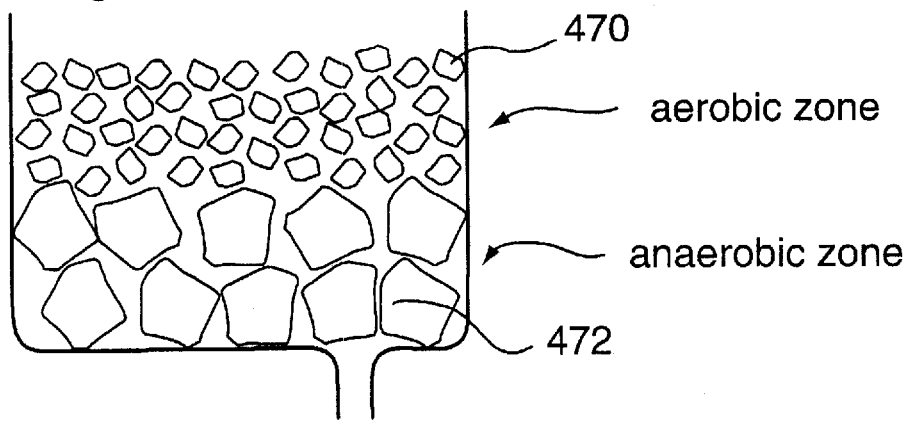
FIG. 13 is a view of a heap of blocks of foam material, graded as to size.

FIG. 13 shows foam blocks that are graded as to size. The smaller blocks 470 are placed above the larger blocks 472. Air is circulated (i.e either allowed to circulate naturally, or fan-driven) over and between the blocks.

Figure 14:
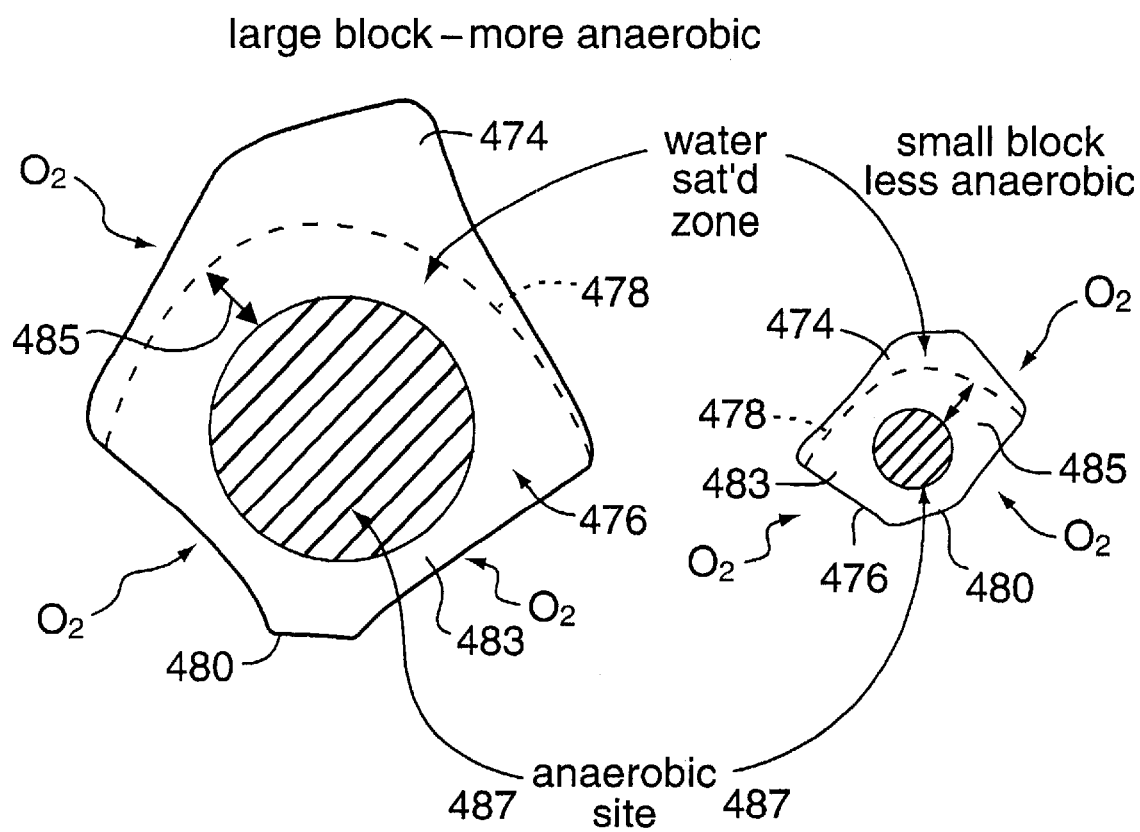
FIG. 14 is a view showing some aspects of the effect of differently-sized blocks.

FIG. 14 shows the difference in effect of the difference in size. FIG. 14 shows the situation between dosings, when the water is static, and each foam block contains its equilibrium volume of water. The top 474 of the block is empty of water, whereas the bottom 476 of the block is saturated with water. The line 478 remarks the water/air boundary. The equilibrium volume of water retained in each block is a function of the nature of the constriction 480 through which the water has to pass to drain out of the block. Capillary/sponge action holds the water up: gravity pulls it down. The tighter the drain constriction, the greater the head of water that can be present in the block, bearing in mind that the water has to be able to drain out of the interior of the block during dosings.

Basically, it may be regarded that the aerobic zone, i.e that zone 483 of the volume of the retained water that lies near the air/water boundary, is of a uniform thickness 485. The anaerobic zone is the zone of the volume of retained water that is more than the distance 485 from the air-water boundary. It is recognised that, all else being equal, the larger the block, the larger the anaerobic zone. The smaller blocks 470, with their higher surface-area-to-volume ratio, are more effective at promoting aerobic activity.

Figure 15:
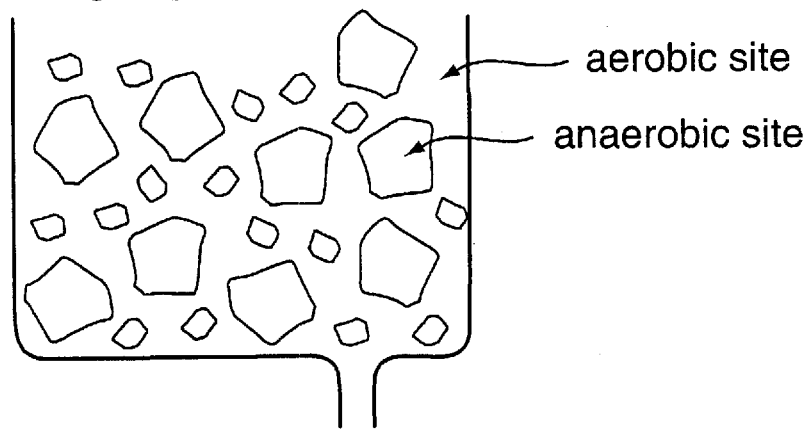
FIG. 15 is a view of a heap of blocks of foam material, arranged randomly.

The different sizes of the blocks can simply be mixed, as shown in FIG. 15, but preferably, as mentioned in relation to FIG. 13, the larger foam blocks 472 are placed at the bottom of the heap, and the smaller blocks 470 are placed at the top. It is easier to promote a good air circulation near the top of the heap; also, it is preferred to get most of the ammonium out of the water (i.e converted to nitrate), in the smaller blocks, before the water is allowed to become anaerobic, in the larger blocks.

Figure 16:
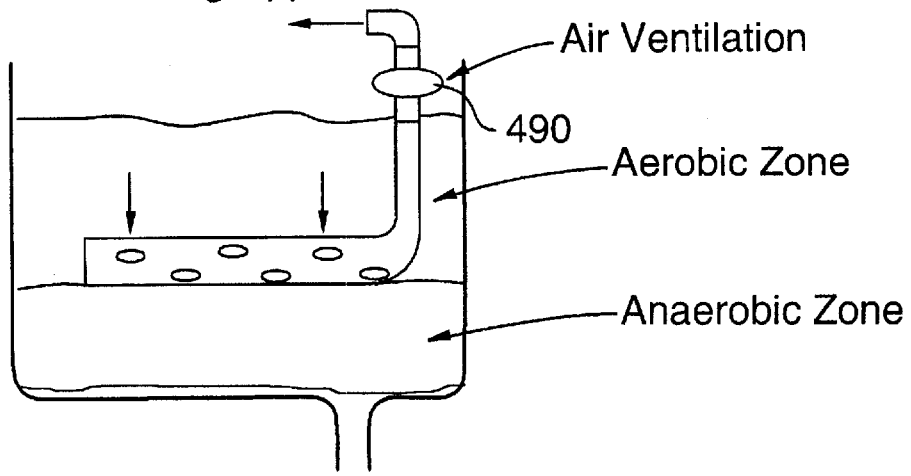
FIG. 16 is a diagram showing the arrangement of a powered fan in a treatment medium.

Another way in which the aerobic-at-the-top /anaerobic-at-the-bottom predominances can be promoted is shown in FIG. 16. Here, a mechanical ventilation system 490 drives air through the upper part of the heap.

As mentioned, basically, the greater the anaerobic activity that can be promoted, the better, provided this can be done without compromising the aerobic activity. The advantages of the anaerobic activity are, first: the anaerobic micro-biological BOD-removal reactions create less organic solids than corresponding aerobic reactions, and for this reason a treatment system that includes a substantial anaerobic component can be dosed (with waste-water) at higher rates than a system that does not.

A second reason for promoting anaerobic activity is to aid denitrification. Given that the ammonium in the waste-water has been converted to nitrate, by oxidation, it is sometimes necessary or preferred to break down the nitrate immediately (where the water is to be used as drinking water, including animals' drinking water, for example) and in any event breaking down the nitrate is beneficial. Nitrate can be broken down by reduction, under anaerobic conditions, and therefore it the water going into the anaerobic interior zones inside the blocks contains nitrate, nitrate reduction Will (or will at least start to) take place. It is noted that, where nitrate reduction is desired, the separation of the heap of blocks into large blocks at the bottom, small blocks at the top, allows for the aerobic activities to convert (most of) the ammonium to nitrate before the water reaches the large blocks (i.e the blocks that have a large anaerobic zone) underneath.

It might be considered that the large lower foam blocks 472 could in fact be left under water, such that the circulation of air cannot reach the lower blocks, which would promote the anaerobic reactions even more. However, this is not preferred, if submerged, the water would just tend to pass through the spaces between the blocks, and would establish preferred pathways through the blocks themselves, leaving the remainder of the water to become stagnant. Also, as explained, many of the beneficial aspects of the systems as described herein arise because of the action of the equilibrium-volumes of water that remain suspended in the blocks, between dosings, and because these volumes can then drain progressively from block to block during dosings. However, depending on the mechanism of the nitrate reduction in a particular case, it might be preferred to seal off some of the foam blocks into an anaerobic area.

Denitrification requires, besides the anaerobic conditions, a source of carbon. The designer might prefer to rely on the existing organic matter dissolved in the water to supply the carbon. Or, the dissolved carbon content might be increased by adding molasses (sugar) to the water.

Figure 17:
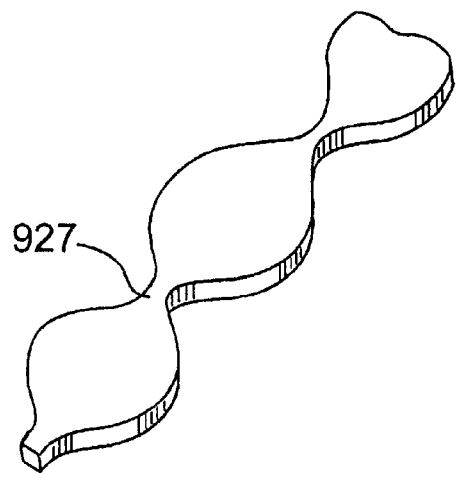
FIG. 17 is a view of a shaped piece of foam material, for use as treatment material.

The cross-sectional profile of the elongate prism 452 of soft foam in FIG. 12 is uniform throughout the length of the prism. In FIG. 17, the cross-sectional profile of a length of soft foam is varied. The narrowings 927 assist in creating constrictions that hold the volumes of water up, in the treatment material, between dosings. Again, the foam can be coiled and twisted, or, being irregular in form, in this case the foam strips can be arranged in regular columns.

Other materials besides open-celled soft resilient foam may be considered as the treatment material. The material should be absorbent, and should be porous enough to support capillary action. An example of a suitable material is mineral-wool, such as Rock-Wool (trademark). This material consist of fibres of glassy rock. Molten rock is spun at high speed, and cooled rapidly to form glass fibres. The fibres are matted together to form a cohesive material. The material can be formed in thick sheets, or into blocks etc. The loose fibrous structure of the material gives rise to pores, into which water can be absorbed, and the material behaves like a sponge when water is present. The material is also soft and squeezable to the touch. Mineral-wool has been used for various purposes, from thermal insulation to hydroponic cultivation.

Figure 18:
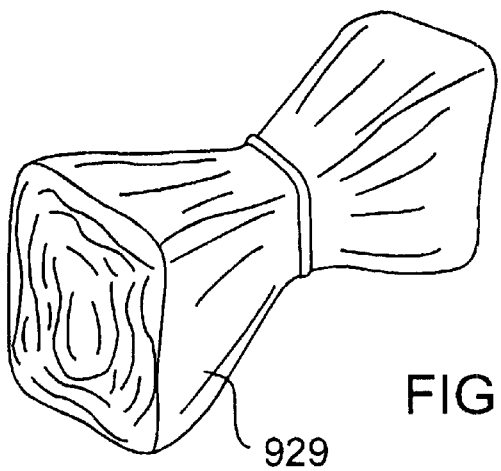
FIG. 18 is a view of a block of mineral wool material, for use as treatment material.

The mineral-wool material can be formed or cut into blocks, which are utilised in the treatment apparatus in the manner as previously described. The mineral-wool material is not very cohesive, and the fibres can tend to separate, allowing the material to fall apart, especially as a result of the accumulation of small physical disruptions caused by dosing with water over a long period of time. Tying the mineral-wool blocks 929 around with twine (FIG. 18) can be useful in maintaining the integrity of the blocks. It should be expected that the performance of the mineral-wool blocks will not be equal to that of the soft foam blocks, but nevertheless a worthwhile treatment effect can be expected.

The mineral-wool material can also be arranged as a coiled elongate prism, as described in relation to the foam material.

Also, mineral-wool is (or can be) a directional material, in that the mineral-wool fibres tend to matt together in platelets, and the platelets tend to form loose or puffed layers. Water can flow more readily through the spaces between the platelets than through the platelets themselves. The designer can arrange for the material to be so arranged as to direct the flow of water, and can thereby arrange for a longer residence time of the water within the treatment material, as compared with a material that has no flow-directing characteristics.

Figure 19:
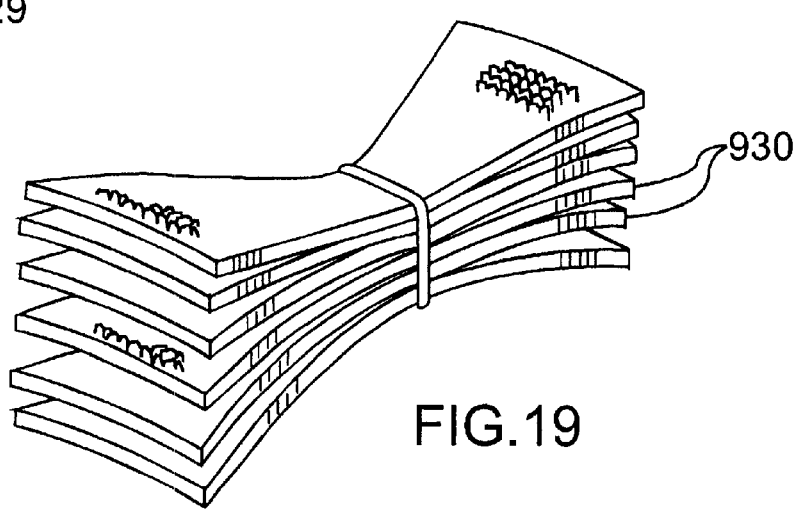
FIG. 19 is a view of a block comprising strips of fabric, for use as treatment material.

Another material that may be considered as the treatment material comprises blocks of towelling. As shown in FIG. 19, the blocks are made by securing several strips 930 of towelling together, e.g by stitching, or stapling, etc. Towelling is of course highly absorbent to water, and the configuration of the towelling in the blocks of loose strips serves to ensure that the absorbed water is well-exposed to the air.

The material should not be such as will tend to be broken down itself by the chemicals and bacteria that are likely to be present in a micro-biological water treatment system, and cotton towelling is somewhat poor in this regard. Other more durable materials include geo-fabrics, which can be made fluffy and absorbent, and which can be expected to be chemically and biologically inert.

In many installations, dosing can be done on a pre-arranged timed basis. Thus, the dosing can be spread evenly throughout a 24-hour period by, for example, pumping dirty water to the sprinklers for two or three minutes every half-hour. A non-powered gravity-fed system cannot be so easily arranged on a timed basis, of course.

Figure 20:
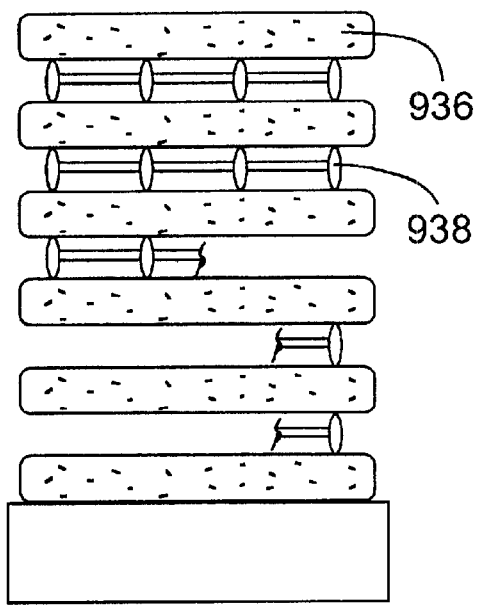
FIG. 20 is a view of a treatment medium, comprising layers of treatment material, held apart with separators.

Another manner in which the treatment material can be configured so as to provide constrictions is as horizontal layers of the treatment material. In the example as shown in FIG. 20, the layers 936 are held separated by a separation means 938 that permits air to pass between the layers. Preferably also, the separation means 938 constricts the flow of water downwards and out of the material in the layer, in much the same manner as the constrictions as previously described between the blocks constricted the flow of water downwards and out of the blocks. Thus, the separated-layers configuration of FIG. 20 means that water can be held up in the layers of treatment material, between dosings, as water was held up in the blocks. The separated-layers configuration can be utilised when the treatment material is foam, mineral-wool, fabric materials, peat, or other absorbent materials.

The different layers 936 can be of different materials. For example, a coarse-celled or inexpensive material may be used for the top-most layer, being the layer that is likely to be damaged by over-loading, should that occur.

What is claimed is:

1. Water treatment apparatus, for the treatment of polluted water, wherein:

the apparatus comprises a treatment station, which includes a container, in which is contained a body of treatment material;

the treatment material is sponge-like, being water-absorbing and water-retaining;

the treatment station includes a water-throughflow-control-means, comprising an inlet and an outlet, and comprising a means for admitting polluted water through the inlet and onto the body of treatment material, and for enabling the polluted water, so admitted, to percolate gradually downwards through the body of treatment material and out through the outlet;

the body of treatment material in the container is in the form of blocks of the sponge-like treatment material;

the arrangement and configuration of the blocks in the container is such that voids and spaces are formed between the blocks, which are so large that water substantially cannot support itself therein by surface tension, whereby water in the voids and spaces can drain therefrom, leaving the voids and spaces open and clear, and enabled for carrying a free circulation of air around and between the blocks;

the water-throughflow-control-means includes means for preventing a build-up of water in, and for moving water out of, the body of treatment material, to the extent that the said voids and spaces remain substantially open and clear of water, and enabled for carrying a free circulation of air around and between the blocks;

the blocks are so arranged that each block has a respective entry-means through which water can enter the block from above, and a respective drainage-means;

the drainage means comprises the aggregate of means whereby water can drain out from the respective block;

the drainage-means comprises a means for partially constricting drainage of water from the block;

a relationship between capillary sponge action of the treatment material and the constriction in the drainage-means is such as to cause a substantial residual volume of water to be retained in a lower zone of the interior of the block, without draining away, even when an upper zone of the block is dry;

whereby water drains only partially out of the blocks of treatment material, leaving residual volumes of retained water in the lower zones of the blocks.

2. Apparatus of claim 1, wherein the water-throughflow-control-means includes means for applying the water to the body of treatment material in periodic dosings, and wherein water in the container remains substantially static between the dosings.

3. Apparatus of claim 2, wherein the relationship between the capillary action of the treatment material and the constrictions in the drainage-means is such that the aggregate volume of water retained in all the bottom zones of the blocks, between dosings, is a substantial fraction of the total volume of the treatment material comprising the blocks.

4. Apparatus of claim 3, wherein the relationship between the capillary action of the treatment material and the constrictions in the drainage-means is such that the aggregate volume of water retained in all the bottom zones of the blocks, between dosings, is at least about 25% of the total volume of the treatment material comprising the blocks.

5. Apparatus of claim 1, wherein:
the treatment material is a foam material, which is of an open, cellular structure; cells of the foam material are mutually interconnected; the foam material is elastomeric, flexible, soft, and resiliently deformable.

6. Apparatus of claim 5, wherein:
the foam material is continuous between at least some of the blocks, and the drainage-means comprises a neck of the foam material between those blocks;
and the constriction comprises a reduction in the cross-sectional area of the foam in the neck as compared with the cross-sectional area of the foam in the block.

7. Apparatus of claim 5, wherein:
the blocks of foam material are separate and discontinues between at least some adjacent higher and lower foam blocks;
the higher and lower blocks are in direct touching contact, whereby places of contact are formed between the foam blocks;
the foam material is so resiliently soft and deformable that, at the places of contact, the material of the blocks deforms and spreads resiliently, whereby, at the places of contact, the upper and lower blocks lie in water-transmitting contact with each other over a substantial contact-patch area;
and the places of contact comprise the drainage-means of the higher blocks and the entry-means of the lower blocks.

8. Apparatus of claim 5, wherein:
the foam material is in the form of a prism of foam material, comprising a long length of material having the same cross-section all along the length;
the prism is arranged in the container with its length disposed in a sinuous configuration;
some higher portions of the length lie above other lower portions of the length, and are in direct, touching, surface-to-surface, contact therewith, whereby places of contact are formed between the higher and lower portions;
the places of contact comprise the drainage-means of the higher portions and the entry-means of the lower portions;
the foam material is so resiliently soft and deformable that, at the places of contact, the foam material deforms and spreads resiliently, whereby, at the places of contact, the higher and lower portions lie in water-transmitting contact with each other over a substantial contact-patch area.

9. Apparatus of claim 5, wherein the foam material is in the form of flat slabs, which are disposed in a stack, one above another;
the voids and spaces are comprised by holes in the slabs, being through-holes which are open right through the slab from top to bottom;
the through-holes in an upper slab are in a partially-overlapping relationship with corresponding through-holes in a lower slab, being the next adjacent slab below.

10. Apparatus of claim 5, wherein the foam blocks comprising the body of foam material include large blocks and small blocks.

11. Apparatus of claim 10, wherein the large blocks are located underneath the small blocks.

12. Apparatus of claim 1, wherein:
the structure of the container is such that the container serves to support the blocks mechanically, one above another;
the container is not watertight, and allows the free passage of air outside the container into and through the said voids and spaces.

13. Apparatus of claim 1, wherein substantially none of the voids and spaces are totally enclosed, in that substantially all the voids and spaces are open to each other, and to the outside air.

14. Apparatus of claim 1, wherein each block has a respective outer surface and an interior;
in respect of some of the blocks, a portion of the outer surface of a first block is in direct touching contact with a portion of the outer surface of a second, adjacent block, below;
and another portion of the outer surface of the first block is in direct contact with air in the voids and spaces;
and the touching portions define the drainage-means of the first block, and the entry-means of the second block, whereby water drains from the first block into the, second block.

15. Apparatus of claim 1, wherein the size and shape of the blocks is such that no point inside the blocks is more than about 5 cm from one of the voids or spaces.

16. Apparatus of claim 1, wherein each block of treatment material has a respective outer surface, and a respective interior, and each block has a point in its interior that is at least 2 cm from the nearest point on its outer surface.

17. Apparatus of claim 1, wherein the polluted water is sewage water.

18. Apparatus of claim 1, wherein:
the apparatus includes a subsequent water treatment station;
in the subsequent station, the apparatus includes a second container, containing a second treatment medium, which is effective to promote remediation of contaminants still present in the water from the first container;
the apparatus includes a water-throughflow-conducting-system;
the water-throughflow-conducting-system includes a water outlet from the said container, termed the first container;
the water-throughflow-conducting-system includes a water inlet in the second container;
the water-throughflow-conducting-system includes a conduit, which is so arranged as to conduct the contaminated water from the first container in series from the first container into the second container, whereby water passes from the outlet of the first container, along the conduit, and into the water inlet of the second container;
and the water-throughflow-conducting-system includes a water outlet from the second container.

19. Apparatus of claim 18, wherein the first container is such that all water entering the second container through the water inlet is confined by the container and cannot pass out of the container except through the water outlet of the second container.

20. Apparatus of claim 18, wherein the apparatus includes means for ensuring water cannot backflow or recirculate from the second container back into the first container.

21. A Apparatus of claim 18, wherein the apparatus includes an operable means for forcefully drawing air into and through the voids and spaces whereby, when the means is in operation, air is constantly in motion through the treatment material.

22. Apparatus of claim 18, wherein the second treatment medium, in the second container, is porous and permeable to the extent that the contaminated water can percolate through the medium, and the medium is of such a chemical nature as will lead to a remediation of the contaminant when the contaminated water percolates through the porous material.

23. Apparatus of claim 18, wherein the contaminant in the water includes phosphorus, and the second treatment medium is such as will cause the remediation of the contaminant.

24. Apparatus of claim 23, wherein the second treatment medium comprises crushed limestone.

25. Apparatus of claim 23, wherein the second treatment medium comprises iron or aluminum hydroxide.

26. Apparatus of claim 23, wherein the second treatment medium comprises a matrix of inert particulate material, and having a sufficient iron oxyhydroxide content that the medium is of the characteristic reddish colour associated therewith.

27. Apparatus of claim 23, wherein the apparatus includes a further subsequent treatment station, and the further station is suitable for the remediation of water contaminated with nitrate.

28. Apparatus of claim 18, wherein:
   the water from the first container is still polluted with a contaminant, being a contaminant that can be rededicated by treatment under anaerobic conditions;
   the second treatment medium is a medium that will reduce the contaminant under anaerobic conditions;
   the apparatus includes means for maintaining the second treatment medium under anaerobic conditions.
   the apparatus includes means for ensuring that substantially all oxidizable material in the water is oxidized prior to the water entering the second treatment medium.

29. Apparatus of claim 28, wherein the reducible contaminant in the water is nitrate, and the second treatment medium is such as will cause the reduction of nitrate under reducing conditions.

30. Apparatus of claim 29, wherein the second treatment medium comprises wood chippings or sawdust.

31. Apparatus of claim 29, wherein the second treatment medium comprises shredded paper or cardboard.

32. Apparatus of claim 29, wherein the second treatment medium comprises corn cobs.

33. Apparatus of claim 29, wherein the second treatment medium comprises molasses.

34. Apparatus of claim 29, wherein the second treatment medium comprises iron plus acid from little organic matter.

35. Apparatus of claim 29, wherein the second treatment medium comprises iron plus slow-release silicic acid.

36. Apparatus of claim 29, wherein the second treatment medium comprises pyrite (FeS).

37. Apparatus of claim 1, wherein the apparatus includes a forced-ventilation means, which is so arranged as to ventilate an upper zone of the body of treatment material more than a lower zone thereof.

38. Apparatus of claim 1, wherein the treatment material is fibrous mineral-wool, and each block comprises a respective matted-together aggregation of fibres thereof.

39. Apparatus of claim 38, wherein each block of fibrous mineral-wool is structurally coherent in itself, and the blocks are physically separable from each other.

40. Apparatus of claim 39, wherein the mineral-wool is in the form of layers of matted-together fibres thereof, and each block comprises a respective loosely-secured bundle of the layers.

41. Apparatus of claim 1, wherein the treatment material is towelling, and each block comprises a respective loosely-secured bundle of towelling pieces.

42. Apparatus of claim 41, wherein the towelling is chemically and biologically inert, in the context of water treatment.

* * * * *